(12) United States Patent
Gluck

(10) Patent No.: US 9,442,783 B2
(45) Date of Patent: Sep. 13, 2016

(54) METHODS AND SYSTEMS FOR PROVIDING SECURITY FOR PAGE FRAMING

(75) Inventor: Yoel Gluck, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 669 days.

(21) Appl. No.: 13/168,444

(22) Filed: Jun. 24, 2011

(65) Prior Publication Data

US 2011/0321162 A1 Dec. 29, 2011

Related U.S. Application Data

(60) Provisional application No. 61/358,544, filed on Jun. 25, 2010.

(51) Int. Cl.
*G06F 11/00* (2006.01)
*H04L 29/06* (2006.01)

(52) U.S. Cl.
CPC ............... *G06F 11/00* (2013.01); *H04L 63/00* (2013.01); *H04L 63/101* (2013.01); *G06F 2221/2119* (2013.01)

(58) Field of Classification Search
CPC . H04L 63/1483; H04L 63/00; H04L 63/101; G06F 11/00
USPC ........................................................ 726/22
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |

(Continued)

OTHER PUBLICATIONS

Barth et al. "Securing Frame Communication in Browsers," Communications of the ACM. vol. 52, No. 6 Pub. Date: Jun. 2009, pp. 83-91.*

(Continued)

*Primary Examiner* — Krista Zele
*Assistant Examiner* — James Forman
(74) *Attorney, Agent, or Firm* — Blakely, Sokoloff, Taylor & Zafman

(57) ABSTRACT

Techniques for analyzing a page to be presented by a browser running on a computing platform. The page is disabled. The page is tested to determine if the page is framed by a second page. The page is enabled if the testing indicates that the page is not framed by a second page. Each level of a hierarchy of framed pages is inspected to determine whether each level is authorized. The page is enabled if the inspecting indicates that each level of the hierarchy of framed pages is authorized.

11 Claims, 7 Drawing Sheets

(56) References Cited

U.S. PATENT DOCUMENTS

| | | | |
|---|---|---|---|
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,340,411 B2 | 3/2008 | Cook | |
| 7,620,655 B2 | 11/2009 | Larsson et al. | |
| 8,255,873 B2* | 8/2012 | Lazier et al. | 717/124 |
| 8,650,214 B1* | 2/2014 | Wilhelm | 707/782 |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0278792 A1* | 12/2005 | Ramani et al. | 726/27 |

OTHER PUBLICATIONS

Rydstedt et al. "Busting Frame Busting: a Study of Clickjacking Vulnerabilities on Popular Sites" Pub. Date: Jun. 7, 2010, pp. 1-13.*

* cited by examiner

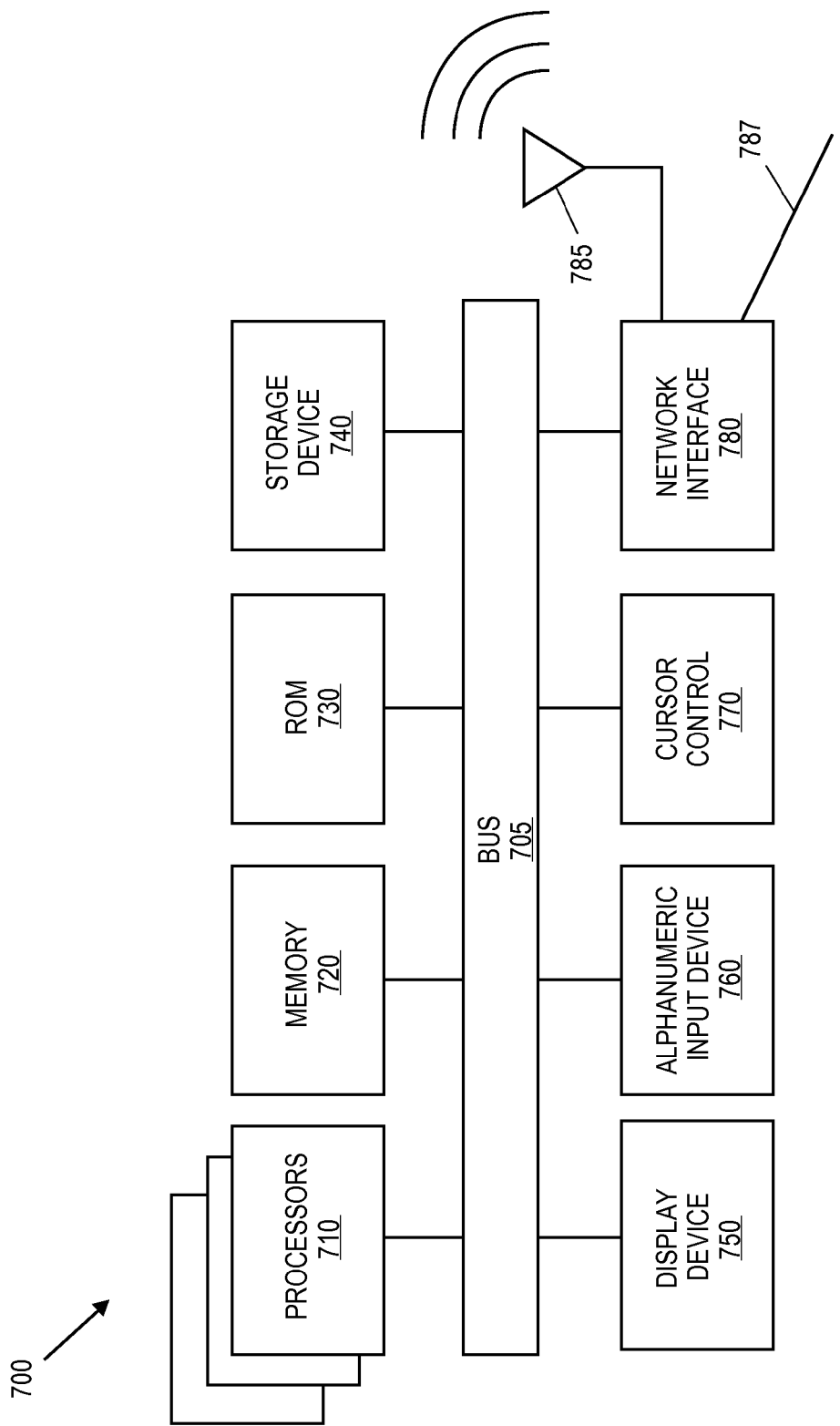

METHODS AND SYSTEMS FOR PROVIDING SECURITY FOR PAGE FRAMING

CLAIM OF PRIORITY

This application claims the benefit of U.S. Provisional Patent Application 61/358,544 entitled Methods and Systems for Providing Security In An On-Demand Service Environment, by Yoel Gluck, filed Jun. 25, 2010, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

Embodiments of the invention relate generally to web application security. More particularly, embodiments of the invention relate to techniques for providing framing analysis.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Various strategies exist for an attacker to attempt to gain unauthorized access and perform unauthorized actions on web sites. Some attackers will try to load pages from within browser frames and iframes under their page. This technique may be used in clickjacking, but there might be other reasons and over time there might be specific vulnerabilities they might try to exploit. Frame busting is the concept of trying to bust out of such framing by un-authorized pages. The current standard approach is within a page that should not be framed, the browser checks to determine if it is framed, and if it is, it can be "busted" to a main page by setting window.location (or something similar) to a framed URL.

Clickjacking is a way to trick the user into thinking he/she is clicking/typing on one object while he/she is actually interacting with another. For example, if the user opens a browser window to 'evil.com' that will have a label and a button next to it. In addition the window may also have another iframe with, for example, src=<bad_action_url>. This iframe may have an opacity of 0 so it is hidden from the user, but still active (another approach it to make only parts of it visible with sizes and scrolling or using plugins that overlay above it). As the user moves the mouse over the button and clicks, he/she will actually click on the invisible iframe button.

BRIEF DESCRIPTION OF THE DRAWINGS

In the following drawings like reference numbers are used to refer to like elements. Although the following figures depict various examples of the invention, the invention is not limited to the examples depicted in the figures.

FIG. 7 is a block diagram of one embodiment of a computing system.

DETAILED DESCRIPTION

Figure 1:
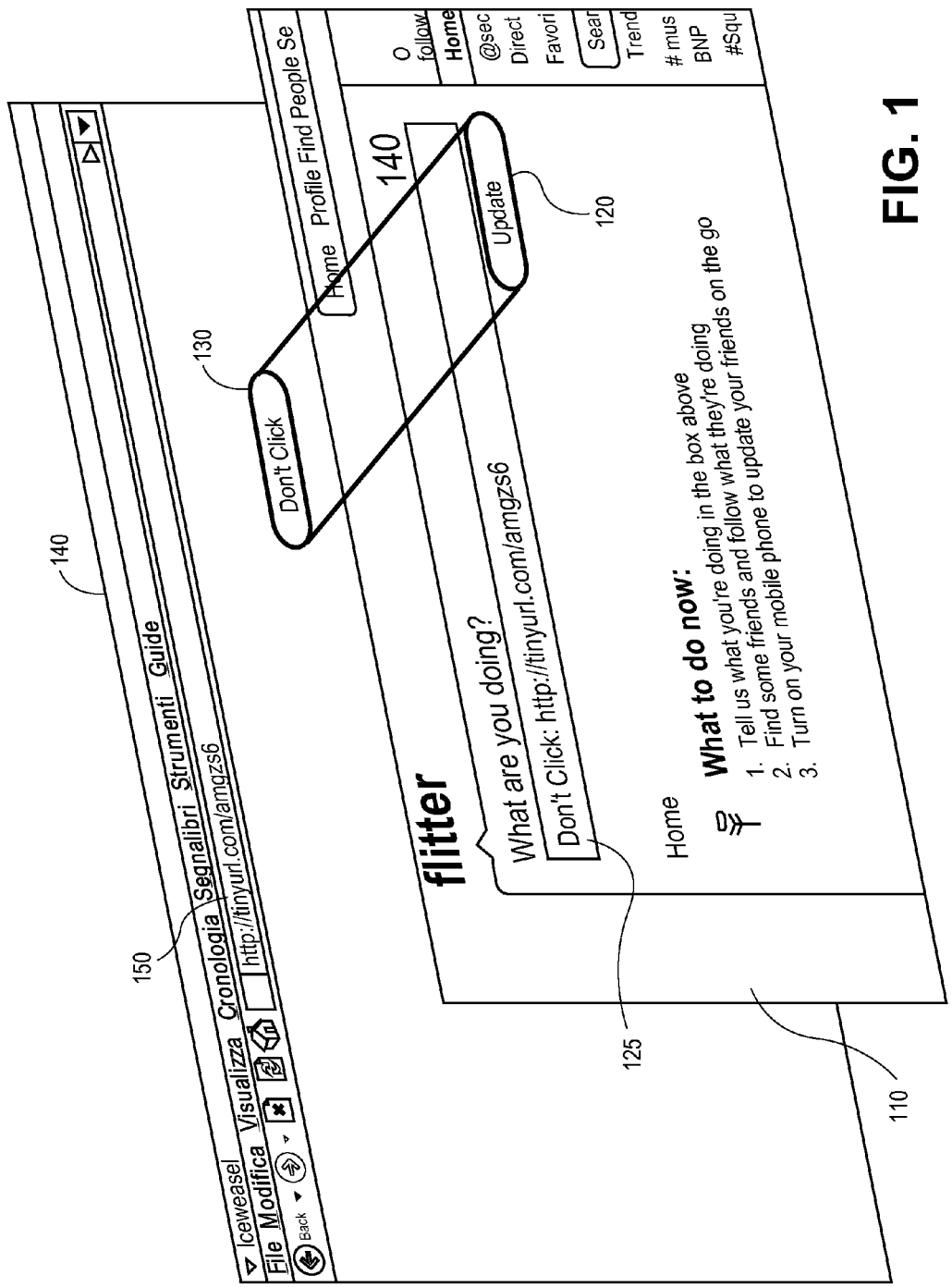
FIG. 1 is an illustration of a configuration to attempt clickjacking.

FIG. 1 is an illustration of a configuration to attempt clickjacking. This example illustrates how an attacker can have a page that looks like their own page with a button (e.g., "Don't Click") that when clicked will actually create a different action than suggested by the image presented to a user.

In the example of FIG. 1, a user may load page 150, which may appear to be the desired page and which includes button 130. An attacker may overlay another page 110 with button 120 directly over button 130 that causes an undesirable result, for example, clicking on 120 that is unknown to the user rather than taking the desired action which is clicking on 130. This may be accomplished by framing page 110 with page 140. This clickjacking attack attempts to trick the user into performing a specified action in order to make the unknown request appear as a legitimate user request.

In addition to the problems described above in a cloud based multitenant environment there is a need to allow framing of some pages for some customers. However, it is desirable to have the capability to only allow clients of that customer to have their page framed and only by the hierarchy of domains/pages they want. One prior approach to checking the framing domain is with referrer header. However, that may not be secure enough and also does not allow for specific URL and for full hierarchy authorization.

In one embodiment, a multitenant database system utilizes tenant identifiers (IDs) within a multi-tenant environment to allow individual tenants to access their data while preserving the integrity of other tenant's data. In one embodiment, the multitenant database stores data for multiple client entities each identified by a tenant ID having one of one or more users associated with the tenant ID. Users of each of multiple client entities can only access data identified by a tenant ID associated with their respective client entity. In one embodiment, the multitenant database is a hosted database provided by an entity separate from the client entities, and provides on-demand and/or real-time database service to the client entities.

Figure 2:
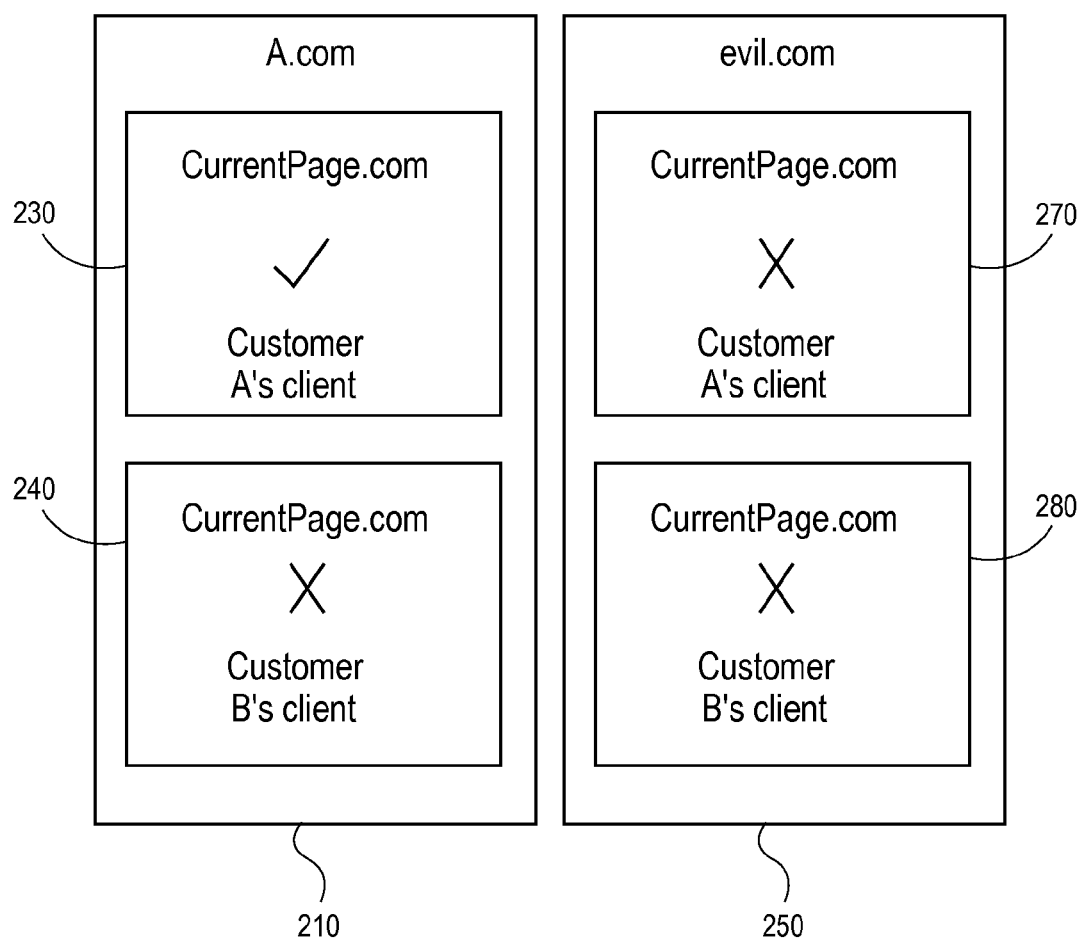
FIG. 2 provides a conceptual illustration of framed pages.

FIG. 2 provides a conceptual illustration of framed pages. The example of FIG. 2 provides a conceptual illustration of allowed page framing and undesirable page framing. The page frame checking and, if necessary, frame-busting functionality may be provided as described herein.

Page 210 corresponds to a first domain (e.g., A.com) and frames a second page (230, 240) from a different domain (e.g., CurrentPage.com). In the example of FIG. 2, in the case of 230 CurrentPage.com is properly framed by page 210, while in the case of 240, CurrentPage.com is not properly framed because for one customer certain framing may be allowed and for another customer framing may not be allowed. In a multitenant environment, for example, different customers or organizations may have different framing policies and/or framing needs. Current browser technology does not support this level of page framing management granularity. Described herein are techniques to support this level of page framing management granularity. In one embodiment, a frame busting technique may be utilized to prevent the framing of page 240 by page 210.

Page 250 corresponds to a different domain (e.g., evil.com) and frames another page (270, 280) from a different domain (e.g., CurrentPage.com). In the example of FIG. 2, both case 270 and case 280 are not properly framed because, in these cases, both customers do not allow framing by evil.com. Current browser technology does not support this level of page framing management granularity. In one embodiment, a frame busting technique may be utilized to prevent the framing of pages 270 and 280 by page 250.

Figure 3:
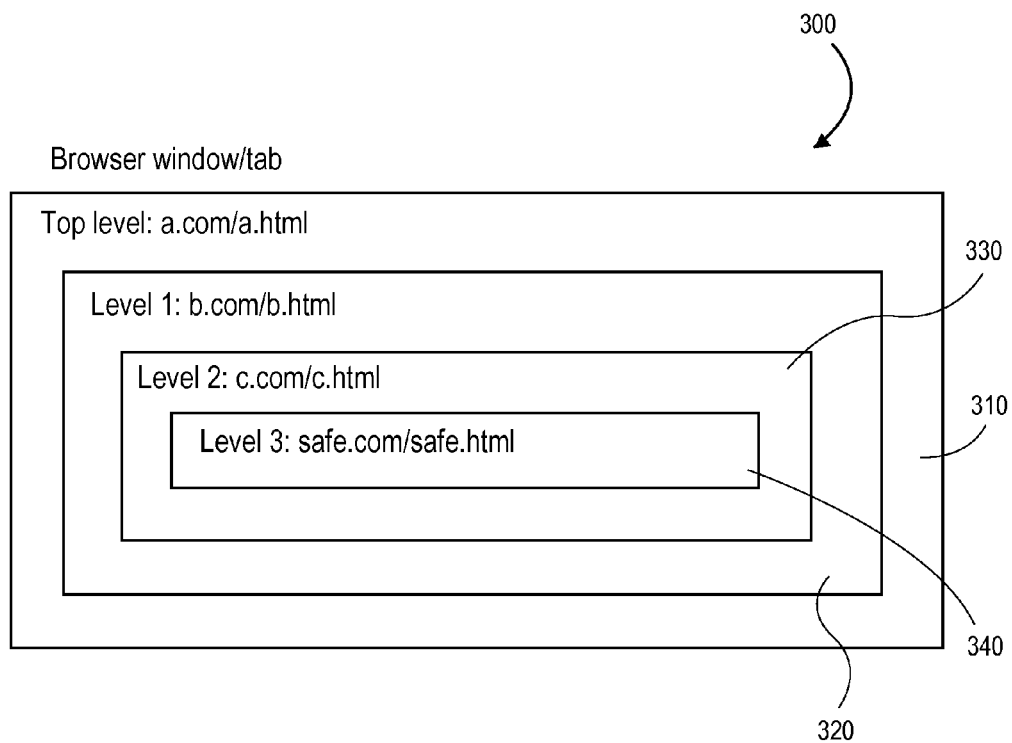
FIG. 3 is a conceptual illustration of framed pages within a browser window (or tab).

FIG. 3 is a conceptual illustration of framed pages within a browser window (or tab). The example of FIG. 3 illustrates a top level page and three levels of framed pages. This is for example purposes only as any number of page framing levels may be supported using the techniques described herein.

Browser window/tab 300 may be any type of browser window/tab known in the art in which one or more pages may be rendered and presented to a user. Top level page 310 (e.g., a.com/a.html) is the main top level page. In the example of FIG. 3, Level 1 page 320 (e.g., b.com/b.html) is framed by top level page 310. Level 2 page 330 (e.g., c.com/c.html) is framed by Level 1 page 320. Level 3 page 340 (e.g., safe.com/safe.html) is framed by level 2 page 330.

In the description of the page framing management techniques described herein, the framing of each page at each level may be analyzed to determine whether the framing is allowed. That is, each level of page framing attempted may be independently analyzed to determine whether the framing should be allowed. When framing that should not be allowed is identified, one or more frame busting strategies may be employed to prevent the attempted page framing that should not be allowed.

Figure 4:
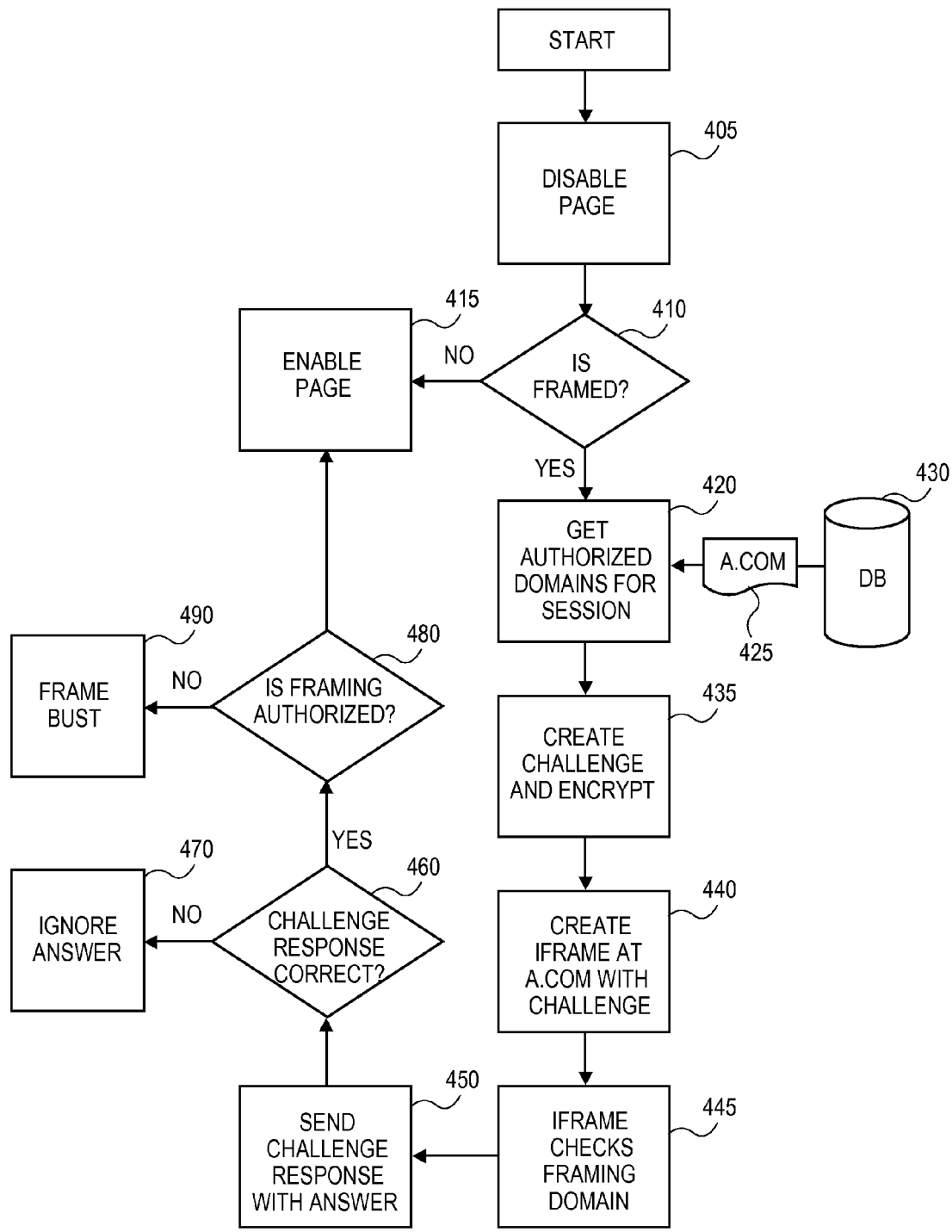
FIG. 4 is a flow diagram of one embodiment of a technique to analyze framing and to employ safe frame busting utilizing a challenge request/response functionality.

FIG. 4 is a flow diagram of one embodiment of a technique to analyze framing and to employ safe frame busting utilizing a challenge request/response functionality. The functionality described with respect to FIG. 4 may provide framing analysis as well as necessary frame busting to a browser or other application through which pages are displayed to a user of a host computing system.

The browser (or other host system component) disables the page, 405. Thus, even if the browser fails to detect and prevent framing, if the page is disabled, an attacker will not be able to use the page for a click-jacking attack or other attacks. Disabling the page can be accomplished in various ways such as, for example, using cascading style sheets (CSS) to hide/disable the page. An even stronger approach would be to not even load the page until confirming framing status. Other techniques for disabling the page may also be utilized.

The browser may check to see if the current page is framed, 410. This can be done, for example, by using browser Document Object Model (DOM) objects to compare the "top" object and the "self" object. If the current page is not framed, then the "self" object is the same object as the "top" object and therefore will be equal. If the current page is framed, then the "self" object and the "top" object will not be equal.

If the page is not framed, 410, then the page may be enabled, 415. Once the page is enabled, the browser may render the page and provide the contents to the user. If the page is framed, 410, further frame authorization checking may be performed.

The browser may retrieve authorized domains for a session, 420. In one embodiment, the browser may maintain, or have access to, one or more policies that describe domains that may be framed, domains that may perform framing, and/or other information related to authorized framing. Further, there may exist hierarchical policies that may be enforced by the browser when analyzing a page having frames. The techniques described herein are described in terms of domains (or pages), but are also applicable to ports, schema, etc.

In one embodiment, some or all of the framing authorization information may be obtained for the current customer/entity (e.g., a.com), 425. The multitenant environment may maintain the information on, for example, a database (430) or any other appropriate storage mechanism. In one embodiment, the browser operates to inspect each level in the hierarchy that is framing the current page and confirm the domains/pages in each level are authorized to be in that position of the hierarchy of framing for the current framed page.

Referring back to the example of FIG. 3, the framing authorization must confirm based on one or more policies (relating to safe.com/safe.html) that 1) c.com/c.html is authorized to be Level 2; 2) b.com/b.html is authorized to be Level 1; and 3) a.com/a.html is authorized to be Top Level. In one embodiment, framing authorization is performed for each level of the frame hierarchy.

If the policy does not allow any domain/page at a particular level, the framing authorization fails. If there are some authorized domains/pages for the level, that framing must be verified against the authorized policy. One approach is to loop through the list of allowed domains/pages and for each, launch a Domain/page confirmation process as described below. Another approach is to use a parameter such as a Uniform Resource Locator (URL) parameter that will provide guidance into which domain/page form the list should be used to confirm for this level.

The domain/page confirmation process is intended to confirm that a specific level in the hierarchy (e.g., L1 in FIG. 3) is indeed a specific domain/page that is authorized to be at that level of the framing for current page. For example, in FIG. 3, the current page is safe.com/safe.html (L3) and the domain/page confirmation process must confirm that Level 1 in the hierarchy (L1) is indeed b.com/b.html.

In one embodiment, the page at L3, for example, launches an invisible iframe with a predefined URL at L1's domain. The URL can be predefined in: the policy, configuration locations, dynamically defined via secure communication, etc. For example, b.com/testFraming.html. Assuming L1 is the authorized domain, and because the testFraming.html is loaded form that same domain, it should be able to confirm if L1 is indeed from that domain/page because of the Same Origin Policy that browsers enforce.

When enforcing the Same Origin Policy, if the pages are indeed from the same domain, the testFraming.html frame can access the page information of L1 and check if it is an allowed framing page (e.g., with a statement like "parent.parent.parent.location.href==$PAGE"). If it is not the same domain it will fail to get the page information. In one embodiment, the page will securely send a message back to the iframe (e.g., corresponding to L3) letting the iframe know that this level domain/page confirmation was successful. In one embodiment, a secure message post mechanism may be used, for example the PostMessage in HTML 5. Other secure messaging techniques may also be used.

After checking if a specific domain/page (e.g., b.com) is allowed to be in that level of framing (e.g., L1 of FIG. 3) for the current page (e.g., L3) the browser should securely send the result of that check back, form the new iframe to confirm this, to the framed page (e.g., L3 of FIG. 3). There are multiple ways to do this. In one embodiment, a challenge request/response method or any other cryptographic approach may be utilized to get an answer securely from the frame. As another example, the confirmation may use secure message posting between domains on the client side (e.g., using HTML 5).

The browser may create a challenge that may be encrypted, 435. An iframe for the appropriate level in the hierarchy is created and loaded from a.com, 440. The iframe is used to check the framing domain, 445. A challenge response answer is returned, 450. If the challenge response passes validation, 460, then the framing of the page is authorized, 480, for the current level in the hierarchy.

If all levels were successful, the page should be enabled. If the framing is authorized, 480, then the page is enabled, 415. If the framing is not authorized, 480, then frame-busting measures may be taken 490. The frame busting may be, for example, keeping the page disabled, or individual frames may be addressed, for example, by preventing framing while allowing the remainder of the page and/or frames to be rendered. Other results may also be supported. If the challenge response is not correct, 460, then the answer is ignored 470.

Figure 5:
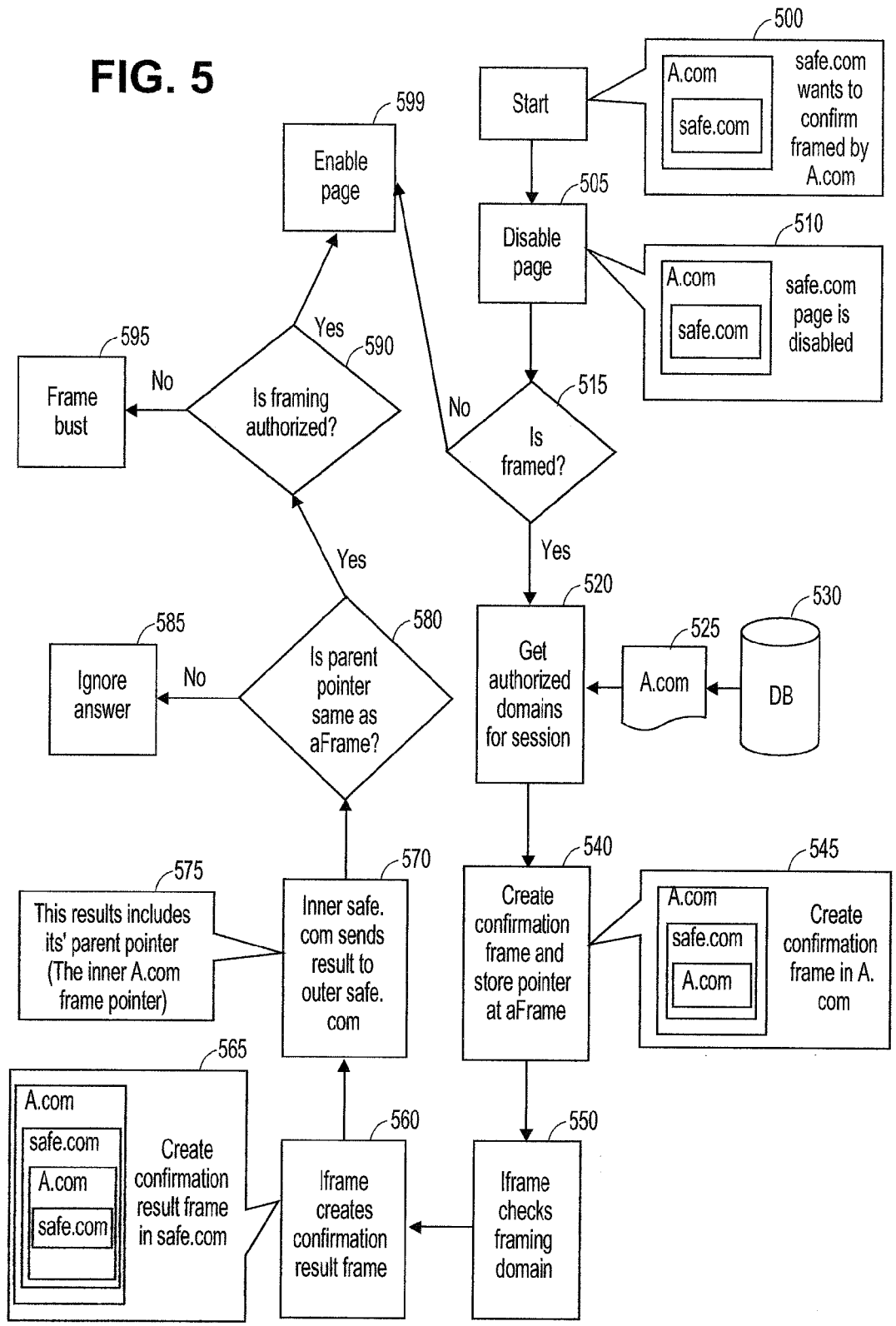
FIG. 5 is a flow diagram of one embodiment of a technique to analyze framing and to employ safe frame busting.

FIG. 5 is a flow diagram of one embodiment of a technique to analyze framing and to employ safe frame busting. The functionality described with respect to FIG. 5 may provide framing analysis as well as necessary frame busting to a browser or other application through which pages are displayed to a user of a host computing system.

In the example of FIG. 5, a page from a first domain (a.com) attempts to frame from a second domain (safe.com), 500. The page is disabled, 505. That is, the framed page (safe.com) is disabled within the framing page (a.com), 510. Any technique known in the art to disable the page may be utilized for this purpose.

If the page is not framed, 515, then the page may be enabled, 599. Once the page is enabled, 599, the browser may render the page and provide the contents to the user. If the page is framed, 515, further frame authorization checking may be performed.

The browser may retrieve authorized domains for a session, 520. In one embodiment, the browser may maintain, or have access to, one or more policies that describe domains that may be framed, domains that may perform framing, and/or other information related to authorized framing. Further, there may exist hierarchical policies that may be enforced by the browser when analyzing a page having frames.

In one embodiment, some or all of the framing authorization information may be obtained for the current customer/entity (e.g., safe.com), 525. The multitenant environment may maintain the information on, for example, a database (530) or any other appropriate storage mechanism. In one embodiment, the browser operates to inspect each level in the hierarchy that is framing the current page and confirm the domains/pages in each level are authorized to be in that position of the hierarchy of framing for the current framed page.

In the example of FIG. 5, the browser may create a confirmation frame and may store a pointer frame, 540. The confirmation frame may have the same domain as the top level frame (a.com) and be framed within the frame to be checked (safe.com), 545. The confirmation frame is used to check the framing domain, 550.

In one embodiment, to send the message back using the same-origin process, the test framing page creates another iframe in its' own DOM tree setting the URL to the domain to which the answer should be sent, 565, and adding the result data to the URL. For example, if b.com/testFraming.html attempts to tell L3 (from safe.com) that the result of checking L1 was successful. It can create an iframe setting the URL to safe.com/
testFramingResult.html?level=L1&result=TRUE The new iframe loaded from the same domain as L3 will then call directly into a function implemented on L3 (for example, using parent.parent.ConfirmFunction( ) and not traversing the tree in other ways, because this ensures calling directly the grandparent which is the correct L3 frame). This function will get parameters such as: level, result, and parent. Level is the level parameter it got in the URL, which will let the L3 know which level was confirmed. Result is the result of the authorization check weather it was indeed the domain/page we thought it was. Parent is the "parent pointer" of the testFramingResult frame. This will be used to compare to the frame L3 created, confirming we are getting the response from the correct grandchild and not from a rouge grandchild that was created just to spoof a result.

The iframe creates a confirmation result frame, 560. The inner frame from the domain being tested (safe.com) sends the result frame to the outer frame from the same domain, 570. The result frame passes its parent frame pointer to the outer frame, 575. If the parent pointer does not match the original pointer stored when the conformation frame was created, 580, the result frame is ignored, 585. If the parent pointer matches the stored pointer, 580, and framing is not authorized, 590, frame busting is employed, 595. If the parent pointer is the same as the stored pointer, 580, and framing is authorized, 590, the page is enabled, 599.

Protection against replay attacks may be provided using solutions such as time stamps, or challenge response. Also, based on the method used to send the messages, signature and/or encryption solutions can be used to protect against forged requests and forged responses (An example can be HMAC). In one embodiment, if a policy might allow multiple hierarchy trees, a parameter, such as a URL parameter, may be used to help identify the hierarchy to be used. Another option will be to try every possible hierarchy form the policy.

In one embodiment, a policy can have an option to allow a branch of hierarchy that does not care what is above it, for example, you can have A→B→login and allow A to be framed under any other hierarchy. In this case, inspection is performed only for framing up to A. Another example is to allow anything to frame login. In one embodiment, a policy can have wild cards for specific levels: for example in the current level: allow any domain, allow pages that start with, allow any of a list of domains or list of pages, etc. In one embodiment, the confirmation process can require other data such as schema (i.e., http, https), port, headers, URL parameters (including values after the hash sign), etc.

In addition, a detection engine can try and analyze standard user behavior with clicks and mouse on the page, and alert for deviations. For example, if users usually wait on the page for a few seconds before clicking, approach the buttons from bottom, click on areas of the button based on location and approach, etc. Then when the detection engine detects a deviation, the action may be blocked, a network administrator may be alerted, a challenge may be provided to the user to confirm the action, etc.

In addition, some randomness can be introduced into the mix helping detect un-usual behavior. For example, if a specific user usually clicks within an area of the button even when it is randomly moved in direction, then for that user when an unusual location is detected, close to the button, or at the original location, etc., it might be an attack and the user clicked on it without seeing it.

In one embodiment, in order to confirm the button is visible and the click/key-press is intentional, a challenge can be presented to the user with tasks such as CAPTHCA, visible keypads with random numbers for them to click on (Server will prompt the user with a value i.e. 527 and the user will have to click on the visible pad to enter that value), enter their password, introduce randomness to the original object locations, etc.

Figure 6:
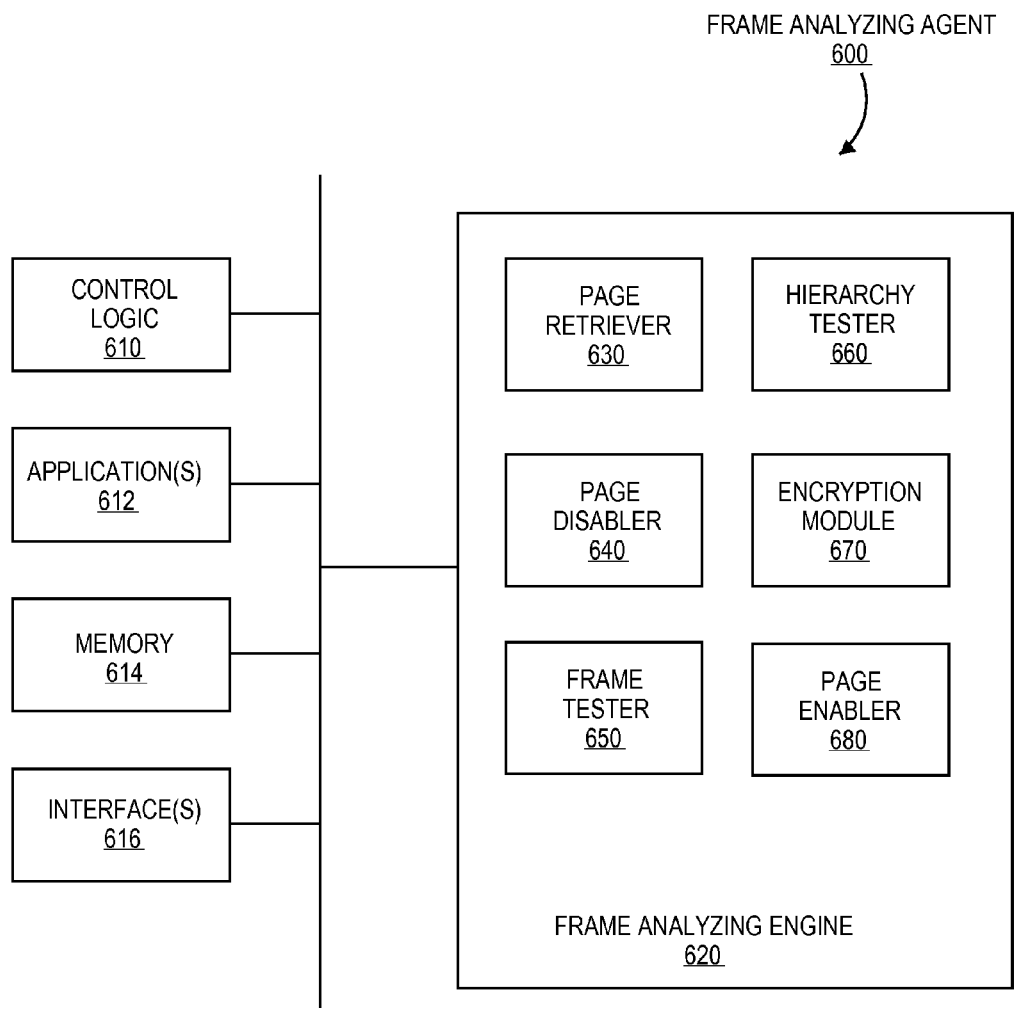
FIG. 6 is a block diagram of a frame analyzing agent that may provide safe frame busting.

FIG. 6 is a block diagram of a frame analyzing agent that may provide safe frame busting. The functionality of frame analyzing agent 600 may be provided by a browser application, a server application, a detection engine, or any combination thereof. Frame analyzing agent 600 may provide the functionality described with respect to FIG. 4 and/or FIG. 5.

Frame analyzing agent 600 includes control logic 610, which implements logical functional control to direct operation of frame analyzing agent 600, and/or hardware associated with directing operation of frame analyzing agent 600. Logic may be hardware logic circuits and/or software routines. In one embodiment, frame analyzing agent 600 includes one or more applications 612, which represent code sequence and/or programs that provide instructions to control logic 610.

Frame analyzing agent 600 includes memory 614, which represents a memory device and/or access to a memory resource for storing data and/or instructions. Memory 614 may include memory local to frame analyzing agent 600, as well as, or alternatively, including memory of the host system on which frame analyzing agent 600 resides. Frame analyzing agent 600 also includes one or more interfaces 616, which represent access interfaces to/from (an input/output interface) frame analyzing agent 600 with regard to entities (electronic or human) external to frame analyzing agent 600.

Frame analyzing agent 600 also includes frame analyzing engine 620, which represents one or more functions or module that enable frame analyzing agent 600 to provide the frame analysis services as described above. The example of FIG. 6 provides several modules that may be included in frame analyzing engine 620; however, different and/or additional modules may also be included. Example modules that may be involved in providing the frame analyzing functionality include page retriever 630, page disabler 640, frame tester 650, hierarchy tester 660, encryption module 670 and page enabler 680. Each of these modules may further include other sub-modules to provide other functions. As used herein, a module refers to routine, a subsystem, logic circuit, microcode, etc., whether implemented in hardware, software, firmware or some combination thereof.

Page retriever 630 operates to retrieve pages to be displayed by a browser. For example, page retriever 630 may operate on a URL or other identifier to retrieve a page to be displayed. Page disabler 640 operates to disable pages until frame checking is completed. In one embodiment, page disabler 640 disables all pages retrieved by page retriever 630 until other modules of frame analyzing engine 620 can complete framing analysis as described herein.

Frame tester 650 operates to perform one or more frame testing techniques as described herein. In one embodiment, frame tester 650 operates to determine whether any pages are framed (e.g., 410, 515). Frame tester 650 may provide additional functionality as well, for example, if frames are detected, providing information about the frames.

Hierarchy tester 660 may operate to analyze frame hierarchies, using one or more of the techniques described herein (e.g., FIG. 4, FIG. 5). Hierarchy tester 660 may utilize, for example, the SOP technique described above, the challenge request/response technique described above, and/or the secure message post technique described above, or any combination thereof.

Encryption module 670 may operate to provide encryption functionality as necessary to hierarchy tester 660. For example, encryption module 670 may be utilized when a challenge request/response technique is used. In an embodiment, where encryption is not utilized, encryption module 670 may be absent from frame analyzing engine 620. Page enabler 680 operates to enable the page if all framing is authorized, or if no framing is detected.

FIG. 7 is a block diagram of one embodiment of a computing system. The computing system illustrated in FIG. 7 is intended to represent a range of electronic systems (either wired or wireless) including, for example, desktop computer systems, laptop computer systems, cellular telephones, personal digital assistants (PDAs) including cellular-enabled PDAs, set top boxes. Alternative electronic systems may include more, fewer and/or different components.

Computing system 700 includes bus 705 or other communication device to communicate information, and processor 710 coupled to bus 705 that may process information. While computing system 700 is illustrated with a single processor, computing system 700 may include multiple processors and/or co-processors. Computing system 700 further may include random access memory (RAM) or other dynamic storage device 720 (referred to as memory), coupled to bus 705 and may store information and instructions that may be executed by processor 710. Memory 720 may also be used to store temporary variables or other intermediate information during execution of instructions by processor 710.

Computing system 700 may also include read only memory (ROM) and/or other static storage device 730 coupled to bus 705 that may store static information and instructions for processor 710. Data storage device 740 may be coupled to bus 705 to store information and instructions. Data storage device 740 such as a magnetic disk or optical disc and corresponding drive may be coupled to computing system 700.

Computing system 700 may also be coupled via bus 705 to display device 750, such as a cathode ray tube (CRT) or liquid crystal display (LCD), to display information to a user. Alphanumeric input device 760, including alphanumeric and other keys, may be coupled to bus 705 to communicate information and command selections to processor 710. Another type of user input device is cursor control 770, such as a mouse, a trackball, or cursor direction keys to communicate direction information and command selections to processor 710 and to control cursor movement on display 750.

Computing system 700 further may include network interface(s) 780 to provide access to a network, such as a local area network. Network interface(s) 780 may include, for example, a wireless network interface having antenna 785, which may represent one or more antenna(e). Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

Computing system 700 may operate to execute a browser application that may perform frame checking as described herein. The browser application may also function to generate graphical output to be displayed to a user of computing system 700. In one embodiment, the browser, as well as other applications, may be implemented as instructions that are executed by processor(s) 710 and/or other computing elements of electronic system 700. The instructions may be stored in memory 720 prior to and/or during execution.

Instructions are provided to memory from a storage device, such as magnetic disk, a read-only memory (ROM) integrated circuit, CD-ROM, DVD, via a remote connection (e.g., over a network via network interface 230) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

A computer-readable medium includes any mechanism that provides content (e.g., computer executable instructions) in a form readable by an electronic device (e.g., a computer, a personal digital assistant, a cellular telephone). For example, a computer-readable medium may include read only memory (ROM); random access memory (RAM); magnetic disk storage media; optical storage media; flash memory devices; etc.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A method for analyzing a page to be presented by a browser executed by one or more processors of a computing platform, the method comprising:

blocking loading of the page with the one or more processors;

determining, with the one or more processors, if the page is framed by a second page;

enabling the page with the one or more processors if the testing indicates that the page is not framed by a second page;

inspecting each level of a hierarchy of framing pages with the one or more processors to determine whether each level is authorized by, for each level of the hierarchy, determining whether the page at that level of the hierarchy is authorized to frame by launching a frame having a locator address corresponding to a domain of the framing page to be tested, determining whether the domain of the launched frame matches a domain of the framing page to be tested, and providing an indication to the framed page of whether the domain of the launched frame and the domain of the framing page to be tested match by utilizing a challenge request-response exchange between the domain of the launched frame and the domain of the framed page to secure the verification process; and enabling the page with the one or more processors if the inspecting indicates that each level of the hierarchy of framing pages is authorized.

2. The method of claim 1 wherein the browser accesses a policy to determine what hierarchy of framing pages is allowed.

3. The method of claim 1 wherein providing an indication to the framed page of whether the domain of the launched frame and the domain of the framing page to be tested match comprises utilizing a secure message post between the domain of the launched frame and the domain of the framed page to secure the verification process.

4. The method of claim 1 wherein determining whether the domain of the launched frame matches a domain of the framing page to be tested comprises utilizing a Same Origin Policy (SOP) test between the domain of the launched frame and the domain of the framing page to be tested.

5. A non-transitory computer readable medium having stored thereon instructions that, when executed by one or more processors, cause the one or more processors to analyze a page to be presented by a browser running on a computing platform by:

blocking loading of the page with the one or more processors;

determining, with the one or more processors, if the page is framed by a second page;

enabling the page with the one or more processors if the testing indicates that the page is not framed by a second page;
inspecting each level of a hierarchy of framing pages with the one or more processors to determine whether each level is authorized by, for each level of the hierarchy, determining whether the page at that level of the hierarchy is authorized to frame by
launching a frame having a locator address corresponding to a domain of the framing page to be tested,
determining whether the domain of the launched frame matches a domain of the framing page to be tested, and
providing an indication to the framed page of whether the domain of the launched frame and the domain of the framing page to be tested match by utilizing a challenge request-response exchange between the domain of the launched frame and the domain of the framed page to secure the verification process; and
enabling the page with the one or more processors if the inspecting indicates that each level of the hierarchy of framing pages is authorized.

6. The medium of claim 5 wherein providing an indication to the framed page of whether the domain of the launched frame and the domain of the framing page to be tested match comprises utilizing a secure message post between the domain of the launched frame and the domain of the framed page to secure the verification process.

7. The medium of claim 5 wherein determining whether the domain of the launched frame matches a domain of the framing page to be tested comprises utilizing a Same Origin Policy (SOP) test between the domain of the launched frame and the domain of the framing page to be tested.

8. A system having one or more hardware processing cores to analyze a page to be presented by a browser executed by the one or more hardware processing cores, wherein the one or more hardware processing cores at least block loading of the page, determine, with the one or more processors, if the page is framed by a second page, inspect each level of a hierarchy of framing pages with the one or more processors to determine whether each level is authorized by, for each level of the hierarchy, determining whether the page at that level of the hierarchy is authorized to frame by launching a frame having a locator address corresponding to a domain of the framing page to be tested, determining whether the domain of the launched frame matches a domain of the framing page to be tested, and providing an indication to the framed page of whether the domain of the launched frame and the domain of the framing page to be tested match by utilizing a challenge request-response exchange between the domain of the launched frame and the domain of the framed page to secure the verification process, and enable the page if the inspecting indicates that each level of the hierarchy of framing pages is authorized.

9. The system of claim 8 wherein the browser accesses a policy to determine what hierarchy of framing pages is allowed.

10. The system of claim 8 wherein providing an indication to the framed page of whether the domain of the launched frame and the domain of the framing page to be tested match comprises utilizing a secure message post between the domain of the launched frame and the domain of the framed page to secure the verification process.

11. The system of claim 8 wherein determining whether the domain of the launched frame matches a domain of the framing page to be tested comprises utilizing a Same Origin Policy (SOP) test between the domain of the launched frame and the domain of the framing page to be tested.

* * * * *